No. 871,085. PATENTED NOV. 12, 1907.
C. A. CLAFLIN.
GATE VALVE.
APPLICATION FILED MAY 7, 1906.
2 SHEETS—SHEET 2.
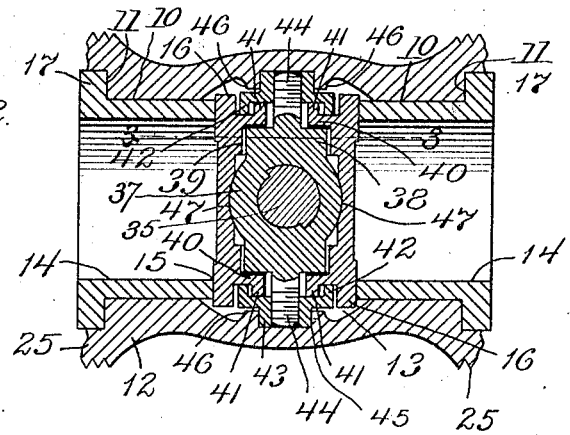
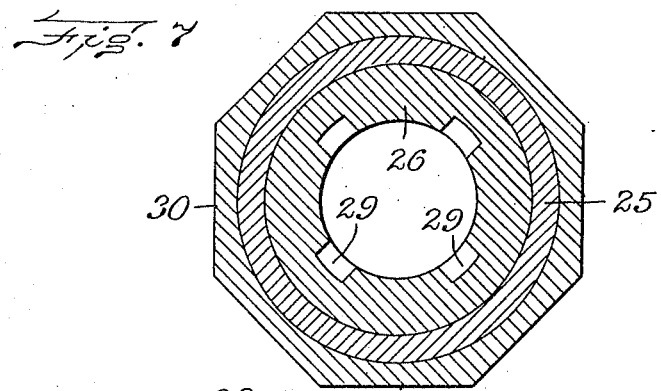
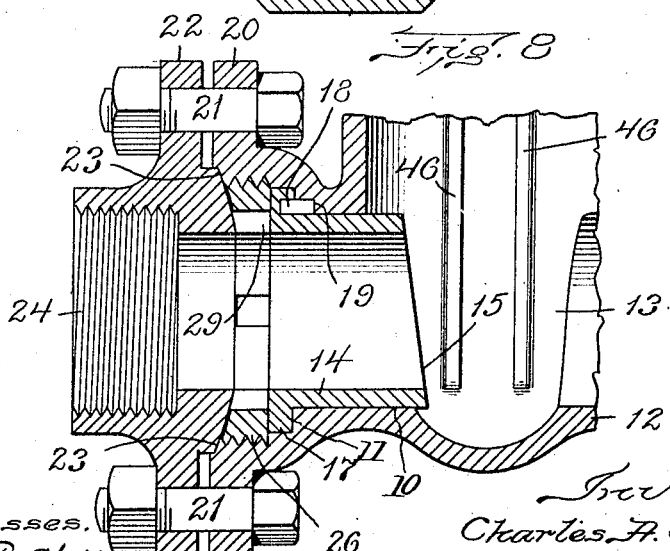
Witnesses.
Walter P. Abell.
E. Batchelder.
Inventor.
Charles A. Claflin,
by Wright Brown Quinby & May
Attorneys.

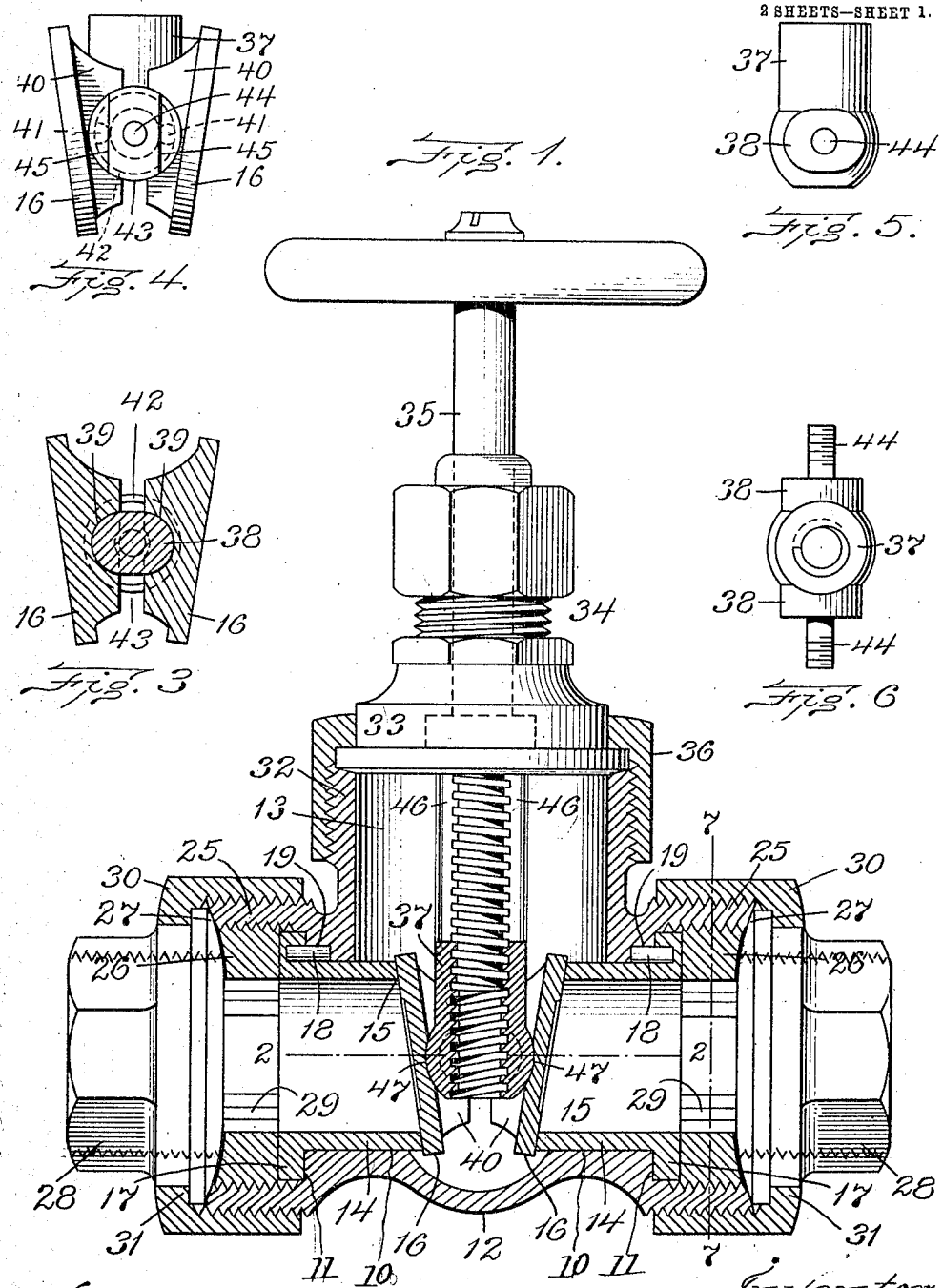

UNITED STATES PATENT OFFICE.

CHARLES A. CLAFLIN, OF MEDFORD, MASSACHUSETTS.

GATE-VALVE.

No. 871,085.  Specification of Letters Patent.  Patented Nov. 12, 1907.

Application filed May 7, 1906. Serial No. 315,501.

*To all whom it may concern:*

Be it known that I, CHARLES A. CLAFLIN, of Medford, in the county of Middlesex and State of Massachusetts, have nvented certain new and useful Improvements in Gate-Valves, of which the following is a specification.

This invention relates to a valve of the gate type, in which the gate comprises oppositely-facing disks, mounted on a carrier, and adapted to stand at different inclinations, so that they will have a wedge-like action in coming to a bearing on their seats, their outer faces conforming to oppositely inclined seats, which are separated by a tapering or wedge-shaped space.

My invention is embodied in a gate-valve of the renewable tapered seat type, and its gate has renewable adjustable disks, said disks being so arranged and held in suspension on the disk carrier, that when the parts of the gate are assembled and moved into contact with the valve seats to close the passage, the gate constitutes an adjustable wedge adapted to conform to any inclinations that the valve seats may have.

The invention has for its object, first to provide certain improvements relating to the construction of the valve casing or body, the said improvements looking to a separable connection between the seats of the gate-disks and the body of the casing, permitting insertion and removal of the valve seats from the ends of the casing, so that the said seats may be readily renewed and repaired.

The invention also has for its object to provide certain improvements in the construction of the carrier and disks which constitute the gate of a valve of this type, the said improvements looking to the convenient assemblage and separation of the parts of the gate, and their retention in operative relation to each other, as well as simplification of the construction and increased effectiveness of operation.

The invention consists in the several improvements which I will now proceed to describe and claim.

Of the accompanying drawings, forming a part of this specification,—Figure 1 represents a longitudinal section of a valve embodying my invention. Fig. 2 represents a section on line 2—2 of Fig. 1. Fig. 3 represents a section on line 3—3 of Fig. 2. Fig. 4 represents a side elevation of the gate detached from the casing. Fig. 5 represents a side view of the disk-carrier. Fig. 6 represents an end view of the disk-carrying portion of the gate. Fig. 7 represents a section on line 7—7 of Fig. 1. Fig. 8 represents a sectional view of a modification.

The same letters of reference indicate the same parts in all the figures.

In the drawings, 12 represents a valve-casing, which is provided with a valve chamber 13 and with alined openings or passages 10 10 at opposite ends of the valve chamber for the flow of the material to be conducted, and for the reception of detachable seat sleeves 14 14, the inner ends of which are beveled, and form seats 15 15 for the valve-disks 16 16 of the sliding gate. The seat sleeves 14 are provided at their outer ends with flanges 17, which are seated on shoulders 11 formed by enlarging the outer portions of the openings 10, the sleeves being movable endwise into the openings 10 until the flanges 17 are seated on the shoulders 11. The said flanges have dowels 18 which interlock with recesses or sockets 19, formed in the casing, the said dowels and sockets positively locking the seat sleeves 14 against turning in the casing. Said dowels and sockets, however, do not interfere with the withdrawal of the seat sleeves outward from the ends of the casing when the couplings are removed, and they also render it certain that when new sleeves or freshly ground sleeves are inserted, they will be placed and positively held with their inclined ends in proper position to co-act with the valves. And from this position they cannot be disturbed by any turning or rotary movement. The casing 12 is provided with suitable means for confining the sleeves 14 against outward movement.

In the construction shown in Fig. 1 the ends of the casing are provided with annular extensions 25, which form the enlarged outer portions of the openings 10, and are both internally and externally threaded, the internal threads engaging annular seat retainers 26, the inner sides of which bear on the flanges of the seat sleeves 14, and hold the seat sleeves in place, should the coupling nut 30 and tail-pipe 28, hereinafter referred to, be detached for any reason. The outer ends of the extensions 25 are concave, and fit convex bosses 27 formed on the inner ends of tail-pipes 28, which are internally or externally threaded to engage connecting lengths of pipe.

The seat sleeve retainers 26 are provided internally with notches 29, or other suitable means for engaging a tool, whereby the retainers may be rotated to screw them into and out of operative position. The external threads of the extensions 25 engage the threads of coupling nuts 30, having flanges 31 which engage corresponding flanges formed on the tail-pipes 28. The top portion of the casing preferably has an externally threaded annular extension 32, forming the upper portion of the valve chamber, the said extension being provided with a suitable bonnet, which, as here shown, includes the base portion 33 of a stuffing box 34, and a flanged coupling nut 36, which engages the external thread of the extension 32. The valve-stem 35 passes through the stuffing box and bonnet, and is engaged with a disk-carrier 37 in such manner that the rotation of the stem causes a valve-operating movement of the carrier, the engagement being effected in this embodiment of my invention by a screw-thread on the stem engaging an internal thread in the carrier. The disks 16 16 are loosely connected with the carrier, and adapted to rock or tip thereon by means which I will next describe.

The carrier 37 is provided at its lower portion with oppositely-projecting arms 38 38, which are preferably elliptical in form, and have convex faces engaging concave sockets 39 39, formed on the inner surfaces of the disks 16, as shown in Fig. 3, the said arms and sockets constituting interlocking members which cause the disks to move with the carrier, although permitting independent tipping movements of the disks. The lower portion of the carrier is rounded or approximately spherical, and the inner surfaces of the disks have concave depressions 47, which are movable on the rounded portion of the carrier, the said rounded portion and depressions constituting the equivalent of a ball-and-socket joint, permitting a limited universal tipping and adjusting movement of the disks, which are thus adapted to assume any angles required by the inclination of the valve seats 15. The disks are provided with coupling members which include inwardly-projecting wings 40, the inner sides of which overlap the outer ends of the arms 38, as shown in Fig. 2. The outer sides of the wings 40 are provided with outwardly-projecting ears 41, which engage the inner surfaces of complemental coupling-members which are annular flanges 42, formed on disk-holding and guiding nuts 43, which are engaged with screw-threaded studs 44, projecting outwardly in opposite directions from the arms 38. When the nuts 43 are turned to place on the studs 44, their flanges 42 engage the outer sides of the ears 41, and thus loosely confine the disks 16 on the carrier without interfering with the independent tipping movements of the disks. The outer sides of the nuts 43 are cut away at their edge portions to form shoulders 45, which engage parallel guide ribs 46, formed on opposite sides of the wall of the valve chamber, the said ribs, by their engagement with the nuts, maintaining the proper position of the gate at all parts of its travel, and also preventing the disk-holding and guiding nuts 43 from being disengaged from the screw-threaded studs 44 while within the valve chamber.

Fig. 8 shows a modified construction for coupling the valve casing to connecting pipe lengths, through the mediumship of complemental flanges and bolts. This modification shows one end only of the valve casing, but it will be understood that the opposite end may be of the same construction. 20 represents a flange formed on the casing, and 22 represents an annular connecting flange secured to the flange 20 by bolts 21, the said flange 22 having on its inner side a convex annular face bearing against a concave seat 23 formed on the casing. The flange 22 has an outwardly-projecting internally-threaded boss 24, adapted to engage a length of pipe.

In each of the above-described embodiments of my invention the detachable part; namely, the tail-pipe 28, shown in Fig. 1, and the flange 22, shown in Fig. 8, has a convex face, which bears on a concave part of the casing surrounding the seat sleeve. These reciprocal bearings surrounding the seat sleeves insure a steam and liquid-tight bearing between the said detachable part and the casing outside of the seat sleeves. Any steam or liquid that might leak between the seat sleeves and the sockets in the casing in which they are located, is therefore prevented from escaping from the valve casing by the said annular bearings.

The seat sleeves, adapted to be applied to and removed from the exterior of the casing, and at the ends thereof, constitute an important feature of my invention, and enable a worn valve seat to be readily removed and either dressed or replaced by a new one with the minimum expenditure of time and labor. The form of the seat sleeves is extremely simple, so that a mechanic can readily, in case of emergency, manufacture a new seat sleeve to supply one that has become unfit for use.

The disk-holding and guiding nuts 43 constitute a very simple and effective means for confining the disks loosely in their operative relation to the carrier, and for maintaining a proper position of the complete gate at all parts of its travel. They insure the retention of the disks in their operative relation to the carrier when the latter is removed from the casing, so that there is no liability of the parts being misplaced and lost. The engagement of the said nuts with the guides 46 in the casing prevents any possibility of the accidental unscrewing of the nuts from the studs 44 when the valve is in operation.

It is obvious that gaskets may be interposed if desired between the seat sleeves and valve casing, also between the tail-pipes and seat-retaining rings. The valve disks are duplicates of each other, so that any disk is interchangeable with any other disk in a valve of a given size. The valve disks, as well as the seat sleeves, are renewable, they being capable of quick and convenient application to and removal from the carrier and valve body.

The improved valve may be used for steam, air, gas, ammonia, and other fluids, and the flow through the valve may be in either direction. All the parts of the valve may be of the same metal or material, if desired, thus insuring uniformity of expansion and contraction throughout the valve.

I claim:

1. A gate-valve comprising a casing having a valve chamber, and openings at opposite ends of the chamber, said openings being enlarged at their outer portions to form shoulders, seat sleeves detachably inserted in said openings, and having flanges bearing on said shoulders, the inner ends of said sleeves constituting beveled or inclined valve seats which project into the valve chamber, means for detachably securing the seat sleeves to the casing, means for positively locking said sleeves against being turned in said openings, and a disk carrier movable between said seats, and provided with valve disks adapted to engage the seats.

2. A gate-valve comprising a casing having a valve chamber, and openings at opposite ends of the chamber, said openings being enlarged at their outer portions to form shoulders, seat sleeves detachably inserted in said openings, and having flanges at their outer ends bearing on said shoulders, and beveled inner ends forming opposed valve seats, the casing and sleeves being provided with means for preventing the rotation of the sleeves in the casing, annular seat-retainers detachably engaging the enlarged outer portions of the openings, and bearing on said flanges to prevent outward displacement of the seat sleeves, a disk carrier movable between the valve seats, and valve disks mounted to tip or rock universally on said carrier.

3. A gate-valve comprising a casing having a valve chamber, and openings at opposite ends of the chamber, said openings being enlarged at their outer portions to form shoulders, seat sleeves removably inserted in said openings, and having flanges at their outer ends bearing on said shoulders, annular seat retainers detachably engaged with the enlarged outer portions of the openings, and bearing on said flanges, said retainers being surrounded by the portions of the casing in which the enlarged outer portions of the openings are formed, and tail-pipes also detachably engaged with the casing, and having faces adapted to bear upon the portions of the casing surrounding the seat sleeves.

4. A gate-valve comprising a casing having a valve chamber, and openings at opposite ends of the chamber, said openings being enlarged at their outer portions to form shoulders, the enlarged portions having internal screw threads, while the external portions of the casing surrounding said enlarged portions have external screw threads, seat sleeves removably inserted in said openings and having flanges at their outer ends bearing on said shoulders, annular seat retainers externally threaded to engage the said internal threads, and bearing on said flanges, and tail-pipes having internally threaded coupling nuts engaged with said external threads, and faces adapted to bear upon the portions of the casing surrounding the seat sleeves.

5. A gate-valve comprising a casing having a valve chamber and opposed valve seats therein, a disk carrier movable between said seats, valve disks adapted to rock universally on said carrier, and means for confining the disks in rocking engagement with the carrier, said means including coupling members adjustably connected with the carrier, and complemental coupling members on said valve disks.

6. A gate-valve comprising a casing having a valve chamber and opposed valve seats therein, a disk carrier movable between said seats, and provided with oppositely-projecting threaded studs having nuts with annular flanges, and valve disks adapted to rock on the carrier, and provided with wings having outwardly-projecting ears engaging said flanges.

7. A gate-valve comprising a casing having a valve chamber and opposed valve seats therein, guides on the wall of said chamber, a disk carrier movable between said seats and provided with oppositely-projecting threaded studs, valve disks mounted to rock universally on the carrier and provided with outwardly-projecting ears, and valve-holding and guiding nuts engaged with said studs, and provided with annular inwardly-projecting flanges engaging the ears on the valve-disks, and with outwardly-projecting shoulders engaging said guides to prevent accidental detachment of said valve disk-holding and guiding nuts.

In testimony whereof I have affixed my signature, in presence of two witnesses.

CHARLES A. CLAFLIN.

Witnesses:
E. H. CRANDELL,
THOS. J. BERRY.